US006939961B1

(12) United States Patent
Schlesiger

(10) Patent No.: US 6,939,961 B1
(45) Date of Patent: Sep. 6, 2005

(54) METHOD FOR THE PRODUCTION OF LOW-VISCOUS WATER SOLUBLE CELLULOSE ETHERS

(75) Inventor: Hartwig Schlesiger, Fallingbostel (DE)

(73) Assignee: Wolf Walsrode AG, Walsrode (DE)

( * ) Notice: Subject to any disclaimer, the term of this patent is extended or adjusted under 35 U.S.C. 154(b) by 0 days.

(21) Appl. No.: 09/856,545

(22) PCT Filed: Nov. 15, 1999

(86) PCT No.: PCT/EP99/08779

§ 371 (c)(1),
(2), (4) Date: May 22, 2001

(87) PCT Pub. No.: WO00/32636

PCT Pub. Date: Jun. 8, 2000

(30) Foreign Application Priority Data

Nov. 27, 1998 (DE) .......................................... 198 54 770

(51) Int. Cl.⁷ ............................ C07G 17/00; C07H 1/00
(52) U.S. Cl. ........................ 536/124; 536/1.11; 536/56; 536/80; 536/90; 536/91; 536/96; 536/123.1
(58) Field of Search ............................ 536/1.11, 56, 80, 536/90, 96, 91, 123.1, 124, 88

(56) References Cited

U.S. PATENT DOCUMENTS 5,480,984 A * 1/1996 Angerer et al. ............... 536/88
5,708,162 A * 1/1998 Hilbig et al. ............... 536/124

FOREIGN PATENT DOCUMENTS

| DE | 1543116 | * | 7/1969 |
| GB | 953944 | * | 2/1962 |

* cited by examiner

Primary Examiner—James O. Wilson
Assistant Examiner—Ganapathy Krishnan
(74) Attorney, Agent, or Firm—Joseph C. Gil; Godfried R. Akorli; Jill Danesvich

(57) ABSTRACT

A process for preparing low-viscosity water-soluble cellulose ethers by the oxidative decomposition of higher-viscosity cellulose ethers with hydrogen peroxide is described. The process involves: (a) forming, under conditions of intensive mixing and at temperatures of 65–125° C., a mixture of, (i) one or more higher-viscosity cellulose ethers, and (ii) an aqueous solution of hydrogen peroxide, the proportions of the mixture being selected in such a way that the hydrogen peroxide content is 0.1–10 wt. % in relation to the dry cellulose ether, the solids content of the mixture is at least 25 wt. % in relation to the total weight of the mixture; and (b) agitating continuously the mixture of step (a) at temperatures of 65–125° C. until at least approximately 90% of the hydrogen peroxide has been spent.

9 Claims, No Drawings

METHOD FOR THE PRODUCTION OF LOW-VISCOUS WATER SOLUBLE CELLULOSE ETHERS

CROSS REFERENCE TO RELATED PATENT APPLICATIONS

The present patent application claims the right of priority under 35 U.S.C. 119 and 35 U.S.C. 365 of International Application No. PCT/EP99/08779, filed 15 Nov. 1999, which was published in German as International Patent Publication No. WO 00/32636 on 8 Jun. 2000, which is entitled to the right of priority of German Patent Application No. 198 54 770.6, filed 27 Nov. 1998.

The technological properties of cellulose ethers are highly dependent on the viscosity of their solutions. Although primarily medium-viscosity cellulose ethers, i.e. those with average molecular weight are processed, high- and low-viscosity cellulose ethers have nevertheless also achieved importance.

Low-viscosity cellulose ethers, which also have a low molecular weight in comparison with medium- and high-viscosity cellulose ethers, can in principle be manufactured in two different ways. Either a low-molecular alkali cellulose is taken as the basis and etherified, or a finished cellulose ether is broken down to the desired molecular weight.

Using a low-molecular alkali cellulose as the basis and producing a cellulose ether by etherification makes the subsequent cleaning process more difficult. The cellulose ether contains a considerable number of short-chain components, which are swollen greatly or washed out by the washing media.

The second possible method mentioned, of breaking down higher-molecular cellulose ethers into low-molecular, low-viscosity cellulose ethers can be achieved by the action of oxidising agents, for example hypochlorite or hydrogen peroxide.

The oxidative decomposition of high-viscosity cellulose ethers can be carried out after the cleaning process. This avoids washing losses and difficulties during the washing process.

The specifications listed below give a summary of the processes currently used to break down high-viscosity cellulose ethers after etherification and washing:

DE 2 016 203 from The Dow Chemical Co. claims a process for reducing the viscosity of cellulose ethers with hydrogen peroxide. For this process a substantially dry, free-flowing cellulose ether with a water content of less than 5 wt. % is mixed with a 10 to 50% hydrogen peroxide solution and the mixture obtained is heated to 50 to 150° C.

DE 1 543 116 from Kalle AG claims a process for the production of low-viscosity cellulose ethers by oxidative decomposition of higher-viscosity cellulose ethers with hydrogen peroxide. This process is characterised in that, a higher-viscosity cellulose ether is mixed with an aqueous solution of hydrogen peroxide, the water content of the mixture not exceeding 75 wt. % in relation to the total quantity. The mixture is then dried at temperatures of 100° C. to 250° C. until the hydrogen peroxide is spent. Here, the loss of moisture and of hydrogen peroxide run virtually in parallel with the reduction in viscosity.

These processes have in common, that a low-viscosity cellulose ether in dry powder or granule form results directly from the decomposition reaction. Either drying is carried out before the decomposition reaction and the process is carried out with low moisture contents, or the process begins with a wet product and ends with low moisture contents. The loss of viscosity then runs virually in parallel with the loss of moisture.

The object was to provide a process which allows the viscosity to be set immediately after washing of the cellulose ether in such a way that the subsequent drying, shaping (grinding, granulation) and mixing are not affected and that the decomposition reaction is not affected by the subsequent process steps drying, shaping (grinding, granulation) and mixing.

This object was achieved in that a higher-viscosity water-soluble cellulose ether as obtained after washing, was mixed with an aqueous solution of hydrogen peroxide, the dry content of the mixture not exceeding 25 wt. % in relation to the total quantity. The mixture is then continuously agitated at temperatures of 65–125° C., preferably 75–100° C., until the hydrogen peroxide is spent, and then dried.

By this process a low-viscosity water-soluble cellulose ether is obtained. Surprisingly the subsequent process steps for the production of cellulose ethers ready-for-sale, such as drying, shaping (grinding, granulation) and mixing are not affected by the decomposition reaction. The degree of moisture and grinding can be set independently of the reduction in viscosity.

Low-viscosity cellulose ethers are deemed here to be cellulose ethers of which 2% aqueous solutions have viscosities of 2 to 400, in particular 2 to 100 mnPa/s (Haake Rotovisko) at 20° C. and a shear rate of 2.55 $s^{-1}$. A higher-viscosity ceflulose ether is deemed here to be a cellulose ether of which 2% aqueous solutions have a viscosity of 100 to 100,000, preferably 400 to 20,000 mPa/s at 20° C. and at a shear rate of 2.55 $s^{-1}$. Here the viscosity reduction in the end product as compared with the raw material, brought about by the process according to the invention, preferably amounts to at least 50%, in particular 70%, and more particularly 98%.

Ionic or non-ionic cellulose ethers may be used as raw materials, such as preferably carboxymethyl cellulose, hydrophobically modified carboxymethyl cellulose, hydroxyethyl carboxymethyl cellulose, sulfoethyl cellulose, hydrophobically modified sulfoethyl cellulose, hydroxyethyl sulfoethyl cellulose, hydrophobically modified hydroxyethyl sulfoethyl cellulose, hydroxyethyl cellulose, hydrophobically modified hydroxyethyl cellulose, methyl cellulose, methyl hydroxyethyl cellulose, methyl hydroxyethyl sulfoethyl cellulose, hydrophobically modified methyl hydroxyethyl cellulose, methyl hydroxypropyl cellulose, hydroxypropyl cellulose and mixtures or derivatives thereof. Preferred raw materials are in particular methyl hydroxyethyl cellulose or methyl hydroxypropyl cellulose. It is advantageous to use water-wet filter cakes of these cellulose ethers, as obtained after washing and separation.

The process can easily be incorporated into the normal method of production of a cellulose ether. The higher-viscosity raw material is centrifuged after washing to a dry content of 25 to 80 wt. % in relation to the total weight.

Then an aqueous solution of hydrogen peroxide at temperatures of 65 to 125° C., is incorporated intensively, optionally step-by-step, the proportions of the mixture being selected in such a way that the hydrogen peroxide content is 0.1 to 10 wt. % in relation to the dry matter and the dry content of the mixture does not fall below 25 wt. % in relation to the total quantity. The mixture is then agitated continuously at temperatures of 65–125° C., preferably temperatures of 75–100° C. until approximately 90% at least, preferably 95% at least of the hydrogen peroxide used is spent. It is preferred more particularly that the mixture be agitated continuously until the hydrogen peroxide has been fully spent. The other process steps such as the addition of additives, crosslinking with di-aldehydes, compression, drying and grinding can then be carried out in the usual way.

A higher-molecular cellulose ether with a dry content of 35 to 80 wt. %, in particular 40 to 55 wt. % in relation to the total quantity, is preferably used in the process. 0.1 to 10 wt. % hydrogen peroxide in relation to the dry cellulose ether, preferably 0.2 to 2.5 wt. %, in particular 0.5 to 1.8 wt. % in relation to the dry cellulose ether is used to break down the higher-viscosity cellulose ethers.

Depending on the raw material, products with 2 wt. % aqueous solutions having acid pH values of 3 to 5 result from the decomposition reaction. It has proved useful here, before, during or after the decomposition reaction, but in any case before any further processing step such as drying or shaping, to set the pH value of the product.

Particularly good results are achived if the pH value is set after the decomposition reaction. The pH value is set using aqueous solutions of salts, which have a pH value of 5 to 12 and optionally contain all or part of the required hydrogen peroxide. These solutions are added to the reaction mixture in such quantities, that the pH value of the mixture after addition is set at more than 4.5, preferably 6 to 7. Aqueous solutions of sodium dihydrogen phosphate, sodium hydrogen phosphate, sodium phosphate, sodium carbonate and sodium hydrogen carbonate or aqueous solutions of mixtures of these salts are advantageously used. Alkali salts of weak acids such as those of citric acid or succinic acid in the form of aqueous buffer solutions can also be used.

An advantage of the claimed process is that the actual reduction in molecular weight is completely separated from subsequent drying. This has the advantage that any type of drying equipment, with varying residence time requirements of the cellulose ether particles to be dried, can be used without affecting the decomposition reaction. Furthermore, only one piece of equipment, the mixer in which the decomposition reaction is to be carried out, is affected by the corrosive properties of the hydrogen peroxide incorporated. In particular, it is possible to incorporate additives and modifiers after the decomposition reaction, but before drying, into the solvent-wet (e.g. water-wet) cellulose ether. Here, the group of dialdehydes (e.g. glyoxal) is mentioned in particular. These compounds are used to produce solvent-inhibited cellulose ethers. They cannot be used together with the hydrogen peroxide required for the decomposition reaction because of their sensitivity to oxidation. It is also possible to mix in oligomeric or polymeric oxidation-sensitive substances (e.g. polysaccharides, polysaccharide ethers, polyvinyl alcohol, polyester, polyamide) after the decomposition reaction and before drying.

The following examples explain the present invention further.

Examples 1–4

5 kg quantities of methylhydroxyethyl cellulose with a methoxy group content of 24.2–30.5% and a hydroxyethoxy group content of 7.5–14.8% and a moisture content of 50–53 wt. %, in relation to the total quantity and with a viscosity as given in the following table, measured on 2 wt. % aqueous solutions at 20° C. and at a shear rate of 2.55 s$^{-1}$ (Haake Rotovisko), were sprayed with 800 ml aqueous hydrogen peroxide solution. The mixture thus obtained was agitated continuously for 6 hours at 75° C. and then dried.

The quantities of hydrogen peroxide used, the initial viscosity and the final viscosity are shown in the table. The quantities stated relate to the dry methylhydroxyethyl cellulose.

| Number | Initial viscosity (mPa/s) | $H_2O_2$ added wt. % | Final viscosity (mPa/s) |
|---|---|---|---|
| 1 | 7,100 | 0.5 | 134 |
| 2 | 7,100 | 1.0 | 70 |
| 3 | 7,100 | 1.5 | 21 |
| 4 | 400 | 1.5 | 6 |

Examples 5–7

5 kg quantities of methylhydroxyethyl cellulose with a methoxy group content of 21.4–26.1% and a hydroxyethoxy group content of 5.9–9.8% and a moisture content of 52 wt. % in relation to the total quantity and with a viscosity as given in the following table, measured on a 2 wt. % aqueous solution at 20° C. and a shear rate of 2.55 s$^{-1}$ (Haake Rotovisko), were sprayed with 500 ml aqueous hydrogen peroxide solution. The quantity of hydrogen peroxide used was 1 wt. % in relation to the dry methylhydroxyethyl cellulose. The mixture thus obtained was agitated continuously until the hydrogen peroxide had been spent and then dried.

The reaction temperatures, reaction times, initial and final viscosities in each case are shown in the table.

| Number. | Initial viscosity (mPa/s) | Final viscosity (mPa/s) | Reaction temperature (° C.) | Reaction time (h) |
|---|---|---|---|---|
| 5 | 6,000 | 40 | 75 | 6 |
| 6 | 6,000 | 34 | 85 | 5 |
| 7 | 6,000 | 36 | 95 | 3 |

Examples 8–10

5 kg quantities of methylhydroxyethyl cellulose with a methoxy group content of 21.4–26.1%, a hydroxyethoxy group content of 5.9–9.8% and a moisture content of 52 wt. % in relation to the total quantity and with a viscosity as given in the following table, measured on a 2% aqueous solution at 20° C. and a shear rate of 2.55 s$^{-1}$ (Haake Rotovisko), were sprayed with 500 ml aqueous hydrogen peroxide solution. The mixture thus obtained was agitated continuously for 3 hours at 95° C. until the hydrogen peroxide was spent and then sprayed with 250 ml of an aqueous solution of sodium hydrogen phosphate and sodium carbonate and mixed for a further 60 minutes. It was then dried.

The initial and final viscosities in each case, the quantities of sodium hydrogen phosphate and sodium carbonate used, the pH values of 2 wt. % solutions of the products and the quantities of hydrogen peroxide used are shown in the table. The quantities given relate to the dry methyl hydroxyethyl cellulose.

| Number | Initial viscosity (mPa/s) | Final viscosity (mPa/s) | Sodium hydrogen phosphate (wt.. %) | Sodium carbonate (wt. %) | pH-values of 2 wt. % aqueous solutions | $H_2O_2$-added (wt. %) |
|---|---|---|---|---|---|---|
| 8 | 6,000 | 36 | 0.25 | 0.2 | 5.6 | 1.0 |
| 9 | 6,000 | 29 | 0.25 | 0.3 | 5.9 | 1.0 |
| 10 | 6,000 | 19 | 0.25 | 0.5 | 5.0 | 1.5 |

Examples 11–12

5 kg quantities of methylhydroxyethyl cellulose with a methoxy group content of 24.2–30.5% and a hydroxyethoxy group content of 7.5–14.8% and a moisture content of 50–53 wt. % in relation to the total quantity and with a viscosity as given in the following table, measured on 2 wt. % aqueous solutions at 20° C., and at a shear rate of 2.55 s$^{-1}$ (Haake Rotovisko), were sprayed with 800 ml aqueous hydrogen peroxide solution. The quantity of hydrogen peroxide used was 1.5 wt. % in relation to the dry methylhydroxyethyl cellulose. An additional 0.5 wt. % (in relation to the dry methylhydroxyethyl cellulose) sodium citrate was added to the hydrogen peroxide solution. The mixture thus obtained was agitated continuously for 5 hours at 90° C. until the hydrogen peroxide was spent and then dried.

The intital and final viscosities in each case and the pH values of 2 wt % solutions of the products are shown in the table.

| Number | Initial viscosity (mPa/s) | Final viscosity (mPa/s) | pH-values of 2 wt. % aqueous solutions |
|---|---|---|---|
| 11 | 400 | 30 | 4.8 |
| 12 | 7,100 | 90 | 4.7 |

What is claimed is:

1. A process for the production of low-viscosity water-soluble cellulose ethers by oxidative decomposition of higher-viscosity cellulose ethers with hydrogen peroxide, comprising:
   (a) forming, under conditions of intensive mixing and at temperatures of 65–125° C., a mixture comprising, (i) higher-visocity cellulose ethers, and (ii) an aqueous solution of hydrogen peroxide which is present in an amount of 0.5 to 1.8 wt % in relation to the dry cellulose ether, the solid content of the mixture is no lower than 25 wt % in relation to the total quantity of the mixture; and
   (b) agitating continuously the mixture of step (a) at temperatures of 65–125° C. until approximately at least 90% of the hydrogen peroxide has been spent,
   wherein during or after the decomposition reaction, the pH value of the mixture of step (a) is set at more than 4.5, by adding to said mixture a second aqueous solution which has a pH of 5 to 12, provided that when said second aqueous solution is added during the decomposition reaction said second aqueous solution may optionally contain, in solution, the hydrogen peroxide required for the decomposition reaction.

2. The process of claim 1 wherein said mixture of step (a) is formed by adding aqueous hydrogen peroxide in portions.

3. The process of claim 1 wherein a higher-viscosity cellulose ether having a dry cellulose ether content of 35–80wt %, in relation to the total quantity of cellulose ether and solvent, is used.

4. Process for the production of low-viscosity water-soluble cellulose ethers according to any one of claims 1, 2, or 3, characterised in that the water soluble cellulose ether is carboxymethyl cellulose, hydrophobically modified carboxymethyl cellulose, hydroxyethyl carboxymethyl cellulose, sulfoethyl cellulose, hydrophobically modified sulfoethyl cellulose, hydroxyethyl sulfoethyl cellulose, hydrophobically modified hydroxyethyl sulfoethyl cellulose, hydroxyethyl cellulose, hydrophobically modified hydroxyethyl cellulose, methyl cellulose, methylhydroxyethyl cellulose, methylhydroxyethyl sulfoethyl cellulose, hydrophobically modified methythydroxyethyl cellulose, methylhydroxypropyl cellulose, hydroxypropyl cellulose or mixtures thereof.

5. Process for the production of low-viscosity water-soluble cellulose ethers according to any one of claims 1, 2, 3 or 4, in that the water-soluble cellulose ether is methylcellulose, methyl hydroxyethyl cellulose, hydrophobically modified methyl hydroxyethyl cellulose, methyl hydroxypropyl cellulose, hydroxypropyl cellulose or mixtures thereof and water-wet filter cakes of these cellulose ethers, as obtained after washing and separation, are used.

6. Process for the production of low-viscosity water-soluble cellulose ethers according to any one of claims 1, 2, 3, or 4 characterised in that the water soluble cellulose ether is methyl hydroxyethyl cellulose or methyl hydroxypropyl cellulose and water-wet filter cakes of the cellulose ethers, as obtained after washing and separation, are used.

7. The process of claim 1 wherein a higher-viscosity cellulose ether having a dry cellulose ether content of 40 to 55 wt. %, in relation to the total quantity of cellulose ether and solvent, is used.

8. The process of claim 1 wherein the pH value of the mixture of step (a) is set at 6 to 7.

9. The process of claim 1 wherein said second aqueous solution comprises a member selected from the group consisting of sodium dihydrogen phosphate, sodium hydrogen phosphate, sodium phosphate, sodium carbonate, sodium hydrogen carbonate, alkali salts of citric acid, alkali salts of succinic acids and combinations thereof.

* * * * *